March 3, 1942.  J. LEDWINKA  2,275,153
SPRING SUSPENSION SYSTEM
Original Filed April 8, 1937  4 Sheets-Sheet 1
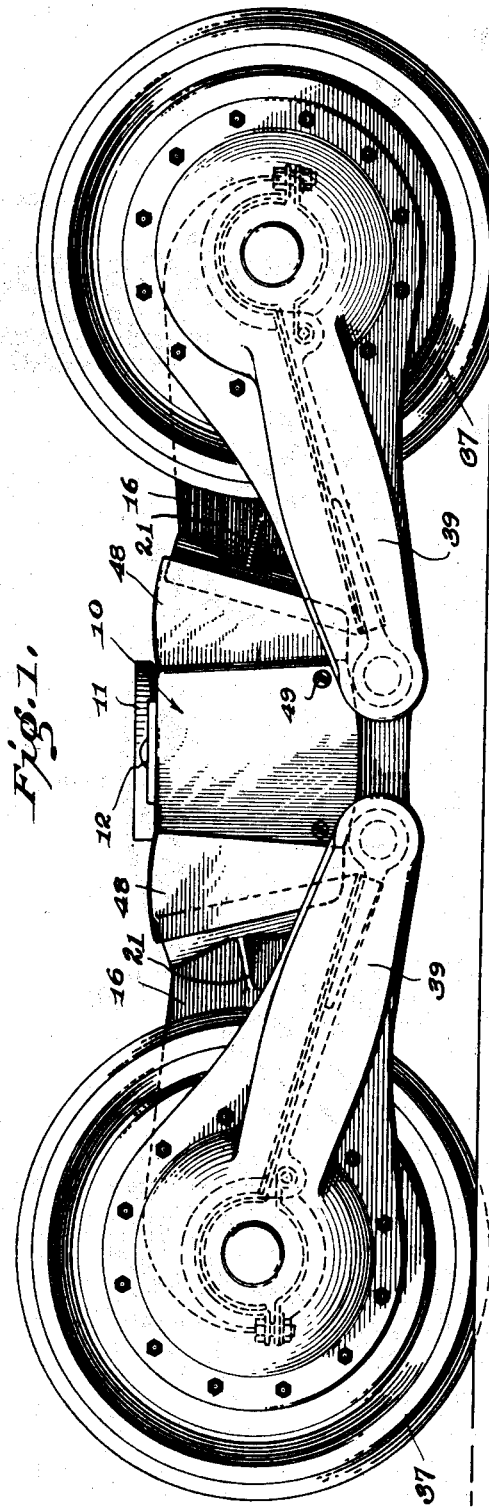
INVENTOR
Joseph Ledwinka
BY John P. Darby
ATTORNEY

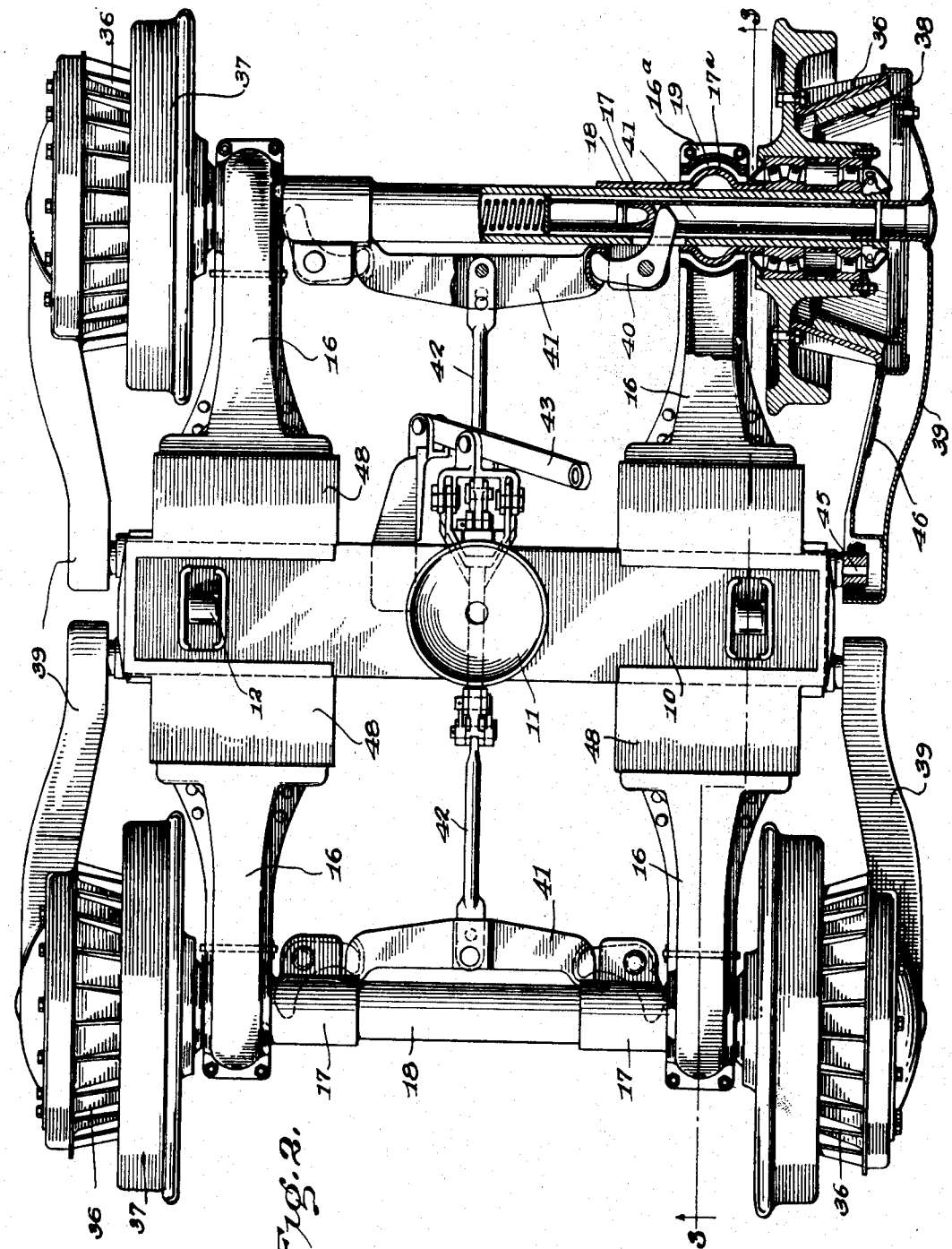

March 3, 1942.　　　　J. LEDWINKA　　　　2,275,153
SPRING SUSPENSION SYSTEM
Original Filed April 8, 1937　　　4 Sheets-Sheet 3
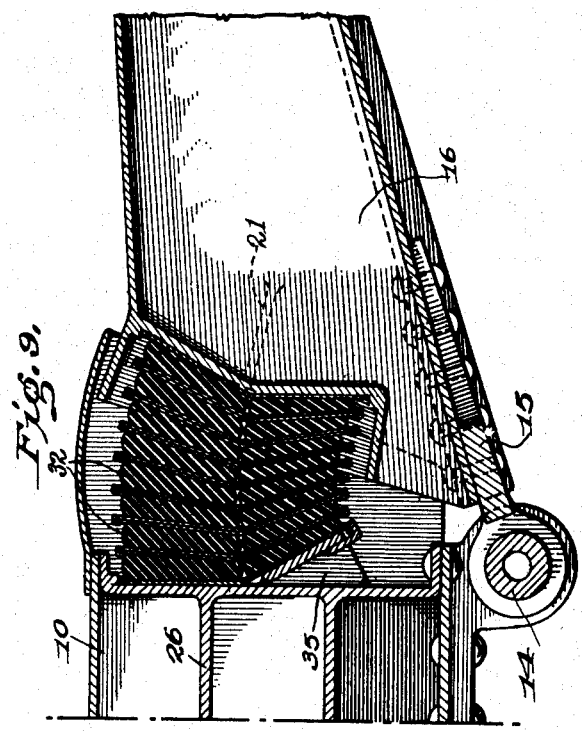
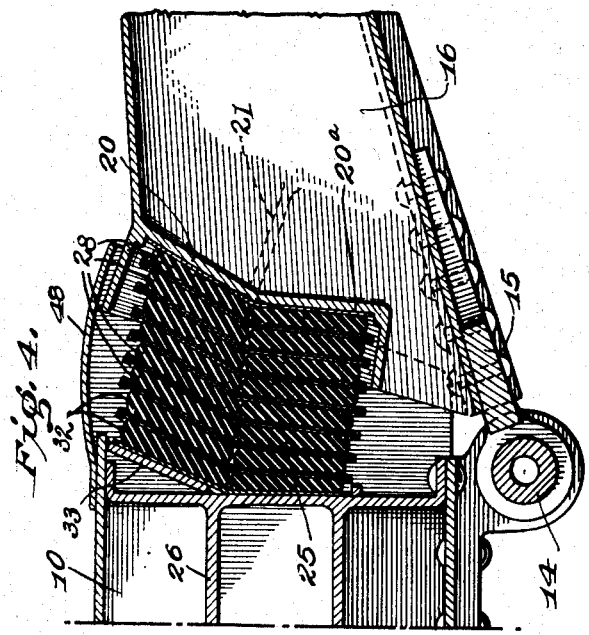
INVENTOR
Joseph Ledwinka
BY John P. Barber
ATTORNEY March 3, 1942. J. LEDWINKA 2,275,153
SPRING SUSPENSION SYSTEM
Original Filed April 8, 1937 4 Sheets-Sheet 4
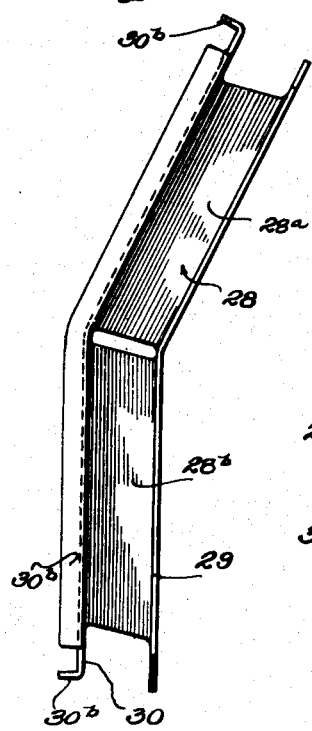
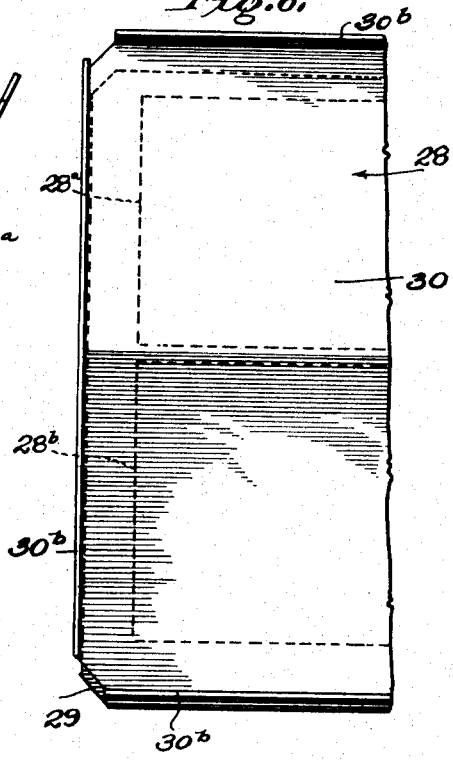
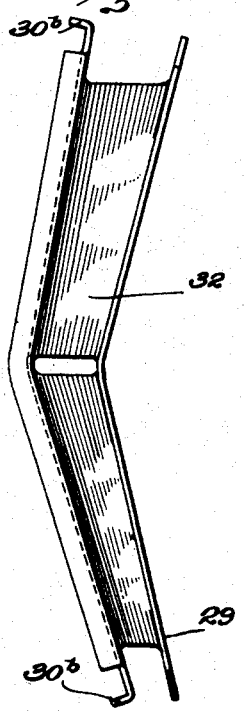
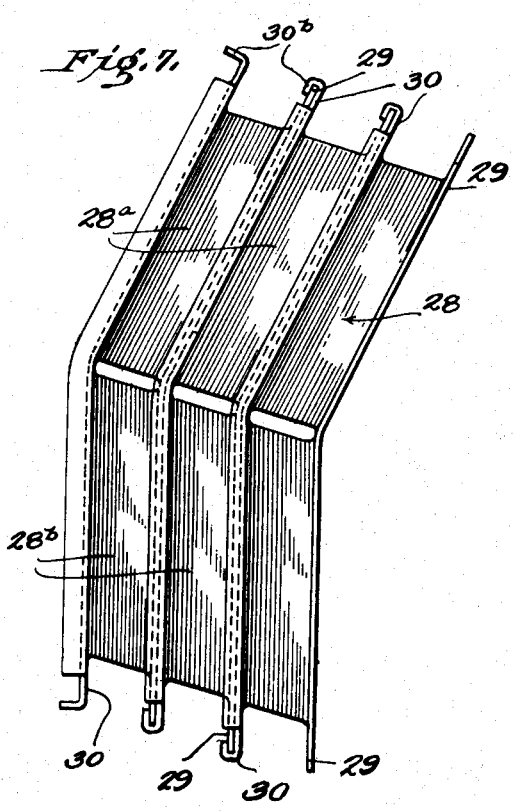
INVENTOR
Joseph Ledwinka
BY
ATTORNEY Patented Mar. 3, 1942

2,275,153

UNITED STATES PATENT OFFICE 2,275,153

SPRING SUSPENSION SYSTEM

Joseph Ledwinka, Philadelphia, Pa., assignor to Edward G. Budd Manufacturing Company, Philadelphia, Pa., a corporation of Pennsylvania Original application April 8, 1937, Serial No. 135,634. Divided and this application September 27, 1939, Serial No. 296,756

14 Claims. (Cl. 267—21)

The invention set forth in this application, which is a division of my copending application, Serial No. 135,634, filed April 8, 1937 for Vehicle (now Patent No. 2,197,727), is directed to an improved spring suspension system particularly adapted for use in rail car trucks.

One of the objects of the present invention is to provide a self-centering rubber panel suspension system adapted for resisting the vertical reactions of loads carried on a bolster which is hinged to the truck frame members.

Another object of the invention is to provide an improved non-metallic suspension system consisting of a plurality of rubber panels individually attached to separate plates, such panels being of an angular shape and adapted for anchoring within the truck framework.

A further object of the invention is to provide a spring suspension of the hinge type with an intermediate panel of rubber in which the outer portion has the greatest compression load to resist bulging and the inner portion takes substantially its full share of the load so that all of the rubber is worked.

Additional objects and advantages of the following invention will appear more particularly from the description herein when taken in connection with the attached drawings illustrative of a preferred form of embodiment of the invention and, in which:

Fig. 1 is a side elevation of an articulated frame truck wherein a spring suspension of the type herein described is operatively embodied;

Fig. 2 is a plan view of the truck with parts of the frame-work broken away to show the internal construction;

Fig. 3 is a vertical section taken substantially along the irregular line 3—3 of Fig. 2 and showing the disposition of spring nests within the side frame members of a rail car truck;

Fig. 4 is an enlarged vertical sectional view similar to a part of Fig. 3 and showing the preferred arrangement of the spring assembly;

Fig. 5 is an end elevation of a typical form of uniform width rubber panel;

Fig. 6 is a fragmentary side elevation of the panel shown in Fig. 5;

Fig. 7 is an end elevation of a series of the rubber panels shown in Fig. 5 showing the method of attachment;

Fig. 8 is an end elevation of a modified panel of tapering width; and

Fig. 9 is a vertical section similar to Fig. 4 showing a modified form of rubber spring construction with panels according to Fig. 8.

In accordance with the present invention, a plurality of spring suspension units or nests are employed for dampening vibration, as for example, in a rail car truck such as that disclosed in the several views of the drawings. Rubber is employed in the aforesaid spring nests for the resilient load reactions occurring during normal operation of the rail car trucks, the rubber being loaded in such a manner that adequate deflection may be obtained with good dampening qualities and the truck is both simplified in construction and quieted in operation.

To illustrate the application of a spring suspension system, in accordance with the present invention, to a rail car truck, a preferred construction of the latter, such as that shown in the drawings, may be provided. In this construction the numeral 10 indicates a transverse beam or transom which has the center plate 11 and side bearings 12 to receive the car body. This transverse beam is provided with a plurality of trunnions 14 on which the side frame members 16 are hinged through leaf members 15. As clearly shown in Figs. 2 and 3, these side frame members extend outward to and are conveniently mounted on a sleeve 17 carried by non-rotatable axle housings 18. Rubber blocks 19 are clamped between the axle housings 18 and the side frame members 16 by the caps 16a (Fig. 3) and with the enlarged portion engaging the enlarged section 17a of sleeve 17, lateral movement of the frame members is limited to self-centering of the bearings and the necessary flexibility for movement of the frame members.

The side frame members 16 are provided with upstanding abutments 20 reinforced by webs 21 shown in Fig. 3, which abutments cooperate with the upstanding faces 10a of the bolster and between these rubber faces 10a and 20 is placed a spring nest generally represented by the character 25. A set of four of these spring nests 25 are carried on the truck, one on each side of the bolster adjacent each articulated frame member 16 so that each frame member becomes an individual part of the spring suspension. It will be seen that vertical loads on the transverse beam 10 tend to cause its movement downward with the load reaction resisted by the spring nests 25 and the transverse beam 10 is adequately reinforced by internal flange members 26 shown in Figs. 3, 4 and 9, which extend transversely of the beam 10 or longitudinally of the truck and adequately resist internal strains set up by the respective spring nests.

The spring nests 25 are preferably comprised of a plurality of resilient panels generally indicated at 28 in Fig. 6, each of which may have a plurality of blocks 28a and 28b of a suitable rubber compound carried between a plurality of plates 29 and 30, one of which is relatively flat and the other of which may be provided with overlapping flanges 30b as shown in Figs. 5 and 8 are adapted to overlap the edges of the adjacent plate 29 of the next rubber panel for attachment thereto. It will of course be understood that the adjacent panels may be otherwise attached to each other.

The plates 29 and 30 are suitably formed at a slight angle to each other, and the abutment faces 10a and 20 are at similar angles, so that the spring nest panels are self-centering and the spring nest as a whole is held by suitable shoulders rather than by pins or other added parts. Wear on the parts is thus eliminated and the spring nest is always in the desired position.

The reaction of vertical loads on the transverse member 10, on the spring nests 25 is primarily that of compression. I have found, however, that with a conical wedge of rubber, there are serious objections which can be overcome by the arrangement of the material substantially as shown in Fig. 4. It is especially desirable to compress the rubber at the greatest radius the most, which prevents any tendency of the rubber to bulge outward. This may be conveniently accomplished by providing the offset ledge 33 which extends away from the transverse beam 10.

In addition, I find it especially desirable to offset inwardly toward the beam 10, the lower face 20a (Fig. 4) of abutment 20 in order to obtain enough rubber for effective flexibility. At the shorter radius, so little would ordinarily be available as to prevent carrying ordinary train car loads. The ratio between the amount of rubber at the top and at the bottom may vary in accordance with the respective radii, but I find it especially desirable to provide approximately 20% more at the top than at the bottom when the ratio of radii is 2 to 1.

If the limitations on the offset of the abutments 20a and 33 are such that other than uniform thick blocks of rubber can be used, the wedge shape type 32 shown in Figs. 8 and 9 may be used entirely or in combination with the uniform thick sections shown in Figs. 5 and 7. In Fig. 4, the spring nest 25 is provided with a combination of uniform thick and variable thickness panels.

A slightly modified form of construction is shown in Fig. 9 in which a wedge 35 is carried at the side portion of the transverse beam 10 and all of the panels are of wedge shape so that substantially the same reaction is obtained. It will be understood that many variations in thickness of rubber and angularity of abutments can be used depending on the flexibility and loads.

The transverse member 10 also carries the cover members 48 which cover the spring nests 25 and this may conveniently be of U-shape, extending across the ends of the transverse member and fastened thereto in any suitable manner.

The details of the brake rigging are not claimed in this application, although it will be noted that the brakes include a brake drum 36 carried by the wheels 37. The brake shoes 38 are carried by the torque arm 39, the center of which has a hollow post 41 which is extended into the hollow axle 18 and maintains concentricity. Operation of the brake is by means of this hollow post which is actuated internally by bellcrank 40 which is in turn operated by equalizer 41 through linkage 42 from the brake lever 43. The torque arm is kept from rotation by its engagement with the trunnion 45 having a resilient bushing and carried on the transverse beam 10. The torque arm is preferably hollow, having an opening 46 for the flow of air into the interior of the brake surfaces to cool them.

While I have shown a preferred form of embodiment of my invention, I am aware that modifications may be made thereto and I therefore desire a broad interpretation of the invention within the scope and spirit of the disclosure herein and the claims appended hereinafter.

What I claim is:

1. A spring assembly built up of a plurality of units, each comprising a panel of a material having the substantial physical properties of rubber and a pair of substantially stiff plates such as metal plates adhesively connected such as by vulcanization to the opposite faces thereof, the plates of adjacent units being provided with interengaging means constraining them to move together, and the outer plates of the assembly being adapted to be secured, respectively, to the opposed parts between which the spring acts.

2. A spring built up of a plurality of units each comprising a flat panel of a material having the substantial physical properties of rubber and a pair of substantially stiff plates such as metal plates adhesively connected such as by vulcanization to the opposite faces thereof, the plates of adjacent units being constrained to move together and the plates at the opposite faces of the assembly being secured to the parts between which the spring acts.

3. A compression spring element which includes a plurality of supporting plates spaced from each other, each of said plates being substantially flat and substantially divided medially thereof into portions forming an obtuse angle and a plurality of blocks of a material having substantially the physical properties of rubber adhesively connected such as by vulcanization to the respective plates.

4. A spring assembly composed of a plurality of units, each of said units comprising a panel of a material having the substantial physical properties of rubber and a pair of substantially stiff plates such as metal plates adhesively connected such as by vulcanization to the opposite sides thereof, the plates of adjacent units being provided with interengaging means constraining them to move together, certain plates of the assembly normally being in continuous operative engagement with the opposed parts between which the spring assembly acts.

5. A spring assembly composed of a plurality of units, each of said units comprising a panel of a material having the substantial physical properties of rubber and a pair of substantially stiff plates such as metal plates adhesively connected such as by vulcanization to the opposite sides thereof, said plates projecting outwardly beyond the panel and the plates of adjacent units being provided with interengaging means constraining them to move together.

6. A spring assembly built up of a plurality of units each comprising a pair of flat panels of a material having substantially the physical properties of rubber arranged at an obtuse angle to each other, and similarly angularly formed plates, one adhesively connected such as by vulcanization to each of the opposite faces of said pair of panels, the plates of adjacent units nesting with each other, and the plates at the opposite faces of the assembly being secured to parts between which the spring acts.

7. A spring assembly composed of a plurality of units, each of said units comprising a panel of a material having the substantial physical properties of rubber and a pair of substantially stiff plates such as metal plates adhesively connected such as by vulcanization to the opposite sides thereof, said plates projecting outwardly beyond the panel, one farther than the other, and the plates of adjacent units being locked together in the assembly by bending the margin of the farther projecting plate over the margin of the other.

8. A cushioning mechanism composed of a plurality of units arranged in superimposed relation, each unit comprising a pad of a material having substantially the physical properties of rubber, and plates secured to opposite sides of said pad, said plates having at least one end thereof projecting outwardly beyond the pad and beyond the corresponding end of the other plate.

9. As an article of manufacture, a spring unit comprising a pad of a material having substantially the physical properties of rubber, and a pair of substantially stiff plates such as metal plates being adhesively secured such as by vulcanization to opposite sides of said pad; said plates being adapted for rigid connection to corresponding plates of similar units and to parts of a construction to be resiliently connected to one another.

10. As an article of manufacture, a spring unit comprising a pad of a material having substantially the physical properties of rubber, and a pair of substantially stiff plates such as metal plates being adhesively secured such as by vulcanization to opposite sides of said pad; said pad being wedge-shaped in that said opposite sides of the pad and said opposite plates include an acute angle; said plates being adapted for rigid connection to corresponding plates of similar units and to parts of a construction to be resiliently connected to one another.

11. As an article of manufacture, a spring unit comprising a pad of a material having substantially the physical properties of rubber, and a pair of substantially stiff plates such as metal plates being adhesively secured such as by vulcanization to opposite sides of said pad; different portions of at least one of said plates being arranged in different planes extending at an angle to one another; said plates being adapted for rigid connection to corresponding plates of similar units and to parts of a construction to be resiliently connected to one another.

12. As an article of manufacture, a spring unit according to claim 11, separate rubber pads being inserted between said different portions of the plate which are arranged in different planes.

13. As an article of manufacture, a spring unit comprising a pad of a material having substantially the physical properties of rubber, and a pair of substantially stiff plates such as metal plates being adhesively secured such as by vulcanization to opposite sides of said pad; different portions of at least one of said plates being arranged in planes extending at an angle to one another; said pad being at least in the region of one of said portions of said plate wedge-shaped in that the opposite sides of the pad in said region and the opposite plates in the same region include an acute angle; said plates being adapted for rigid connection to corresponding plates of similar units and to parts of a construction to be resiliently connected to one another.

14. A spring system comprising a plurality of substantially stiff plates spaced from each other, and blocks or pads of a material having substantially the physical properties of rubber and being arranged between said plates, at least certain portions of plates opposing each other being arranged at an acute angle to one another and the block or pad between them being correspondingly wedge-shaped.

JOSEPH LEDWINKA.